United States Patent
Rahimi et al.

(10) Patent No.: US 10,457,568 B2
(45) Date of Patent: Oct. 29, 2019

(54) METHOD FOR DESALINATION

(71) Applicant: Murdoch University, Rockingham, Western Australia (AU)

(72) Inventors: Bijan Rahimi, Crawley (AU); Hui Tong Chua, Mount Claremont (AU); Alexander Christ, Crawley (AU)

(73) Assignee: MURDOCH UNIVERSITY, National Centre of Excellence in Desalination Australia, Rockingham, Western Australia (AU)

( * ) Notice: Subject to any disclaimer, the term of this patent is extended or adjusted under 35 U.S.C. 154(b) by 292 days.

(21) Appl. No.: 15/303,262

(22) PCT Filed: Apr. 3, 2015

(86) PCT No.: PCT/AU2015/050156
§ 371 (c)(1),
(2) Date: Oct. 11, 2016

(87) PCT Pub. No.: WO2015/154142
PCT Pub. Date: Oct. 15, 2015

(65) Prior Publication Data
US 2017/0029290 A1    Feb. 2, 2017

(30) Foreign Application Priority Data

Apr. 11, 2014 (AU) .................. 2014901335
Mar. 20, 2015 (AU) .................. 2015901007

(51) Int. Cl.
*C02F 1/16* (2006.01)
*B01D 3/06* (2006.01)
(Continued)

(52) U.S. Cl.
CPC .............. *C02F 1/16* (2013.01); *B01D 1/0058* (2013.01); *B01D 3/065* (2013.01); *B01D 3/146* (2013.01);
(Continued)

(58) Field of Classification Search
CPC ...... B01D 1/0058; B01D 3/065; B01D 3/146; C02F 1/041; C02F 1/06; C02F 1/16; C02F 2103/08
See application file for complete search history.

(56) References Cited

U.S. PATENT DOCUMENTS

2013/0153398 A1    6/2013    Chua et al.
2013/0270100 A1    10/2013   Kwak et al.
2013/0309163 A1    11/2013   Peng et al.

FOREIGN PATENT DOCUMENTS

GB            2417435 A      3/2006

OTHER PUBLICATIONS

International Search Report and Written Opinion of the ISA for PCT/AU2015/050156, ISA/AU, Woden ACT, dated May 11, 2015.

*Primary Examiner* — Renee Robinson
*Assistant Examiner* — Derek N Mueller
(74) *Attorney, Agent, or Firm* — Harness, Dickey & Pierce, P.L.C.

(57) ABSTRACT

The invention discloses a method of removing dissolved elements from a liquid. The method comprises a first heating step for heating the liquid using a first heat source, a plurality of distillation steps for purifying the liquid heated by the first heating step, each of the plurality of distillation steps comprising at least one evaporation step and at least one condensation step, and a second heating step, using a second heat source to heat a plurality of flashing chambers, each generating a volume of vapor; wherein the vapor from at least one of the plurality of flashing chambers of the second
(Continued)

heating step is introduced into at least one of the plurality of distillation steps.

11 Claims, 12 Drawing Sheets

(51) Int. Cl.
    *B01D 1/00*     (2006.01)
    *B01D 3/14*     (2006.01)
    *C02F 1/04*     (2006.01)
    *C02F 1/06*     (2006.01)
    *C02F 103/08*     (2006.01)

(52) U.S. Cl.
    CPC ................ *C02F 1/041* (2013.01); *C02F 1/06* (2013.01); *C02F 2103/08* (2013.01)

METHOD FOR DESALINATION

CROSS-REFERENCE TO RELATED APPLICATIONS

This application is a 371 U.S. National Stage of International Application No. PCT/AU2015/050156, filed Apr. 3, 2015, which claims the benefit of and priority to Australian Patent Applications No. 2014901335, filed Apr. 11, 2014 and 2015901007, filed Mar. 20, 2015. The disclosures of the above applications are incorporated herein by reference.

FIELD OF THE INVENTION

The present invention relates to a thermal separation desalination process, more particularly, to an improved low grade heat driven process and system as applied for desalination.

BACKGROUND OF THE INVENTION

Most of the water on the surface of earth is saline and cannot be used for domestic purposes. In areas where fresh water is scarce there is a need to desalinate salt water. Conventional desalination of water is an energy intensive process. Depletion of fossil fuels, high greenhouse gas emissions and rising costs of energy have necessitated the use of unconventional energy sources. Low grade heat sources, whose temperature is not substantially above 100° C., are one such source. Examples of such low grade heat sources may include hot industrial waste fluids like hot water, steam, exhaust gases, process liquor etc. or renewable energies such as geothermal heat, all of which can be used as heat source or a liquid source to be desalinated.

Desalination can be generally categorized into two types: thermal (distillation) systems like MED (Multi Effect Distillation), MSF (Multi Stage Flashing), HD (Humidification-Dehumidification); and membrane systems like RO (Reverse Osmosis).

Low grade heat sources are particularly suitable for the use in thermal desalination methods. Particularly MED including MED process and Vapor Compression (VC) MED process such as Thermal Vapor Compression (TVC) MED process and MSF systems have been developed to use heat from low grade heat sources. Such systems use a heat exchanger coupled to a low grade heat source to heat saline water which is then fed to either an "effect" of a MED system or a "stage" of an MSF system. In such a system, a substantial amount of heat of the low grade heat source remains unused, as it is not transferred to the saline water. Due to this, energy extraction from the low grade heat source is limited. This further results in a heating medium output that is still hot and the saline water obtained can be used for further desalination.

An improvement over the conventional low grade heat source driven MED system is the so called "boosted MED" system. In boosted MED the unused heat from the low grade heat source is reused to heat saline water, which then introduces the generated vapor into an effect of the MED system. This system incrementally improves the efficiency of extraction of heat from the low grade heat source as well as the yield of fresh water. However, the method fails to extract the maximum possible heat energy from the low grade heat source.

According to the foregoing discussion, there still remains a need to improve the efficiency of thermal desalination processes to make desalination environmentally and financially more viable.

SUMMARY OF THE INVENTION

In one aspect, the present invention provides a method of purification of a liquid using a first heat source and a second heat source. The heat sources can be either connected in series or in parallel. The liquid to be purified is heated by the first heat source followed by a plurality of distillation steps, each step including an evaporation step and a condensation step. Fluid in the form of a vapor heated by the second heat source is introduced into the plurality of distillation steps via a plurality of inputs such that temperature of the fluid/vapor introduced is decreasing from the first input to the last input.

In another aspect the present invention provides a system of purification of a liquid. The system includes a first heat source coupled to a first heat exchanger and a second heat source. The first heat exchanger being used to heat the preheated or unheated liquid. Further included is a plurality of distillation chambers in series, each having at least a condensing means and an evaporating means, the distillation chambers being configured to receive the heated liquid heated from upstream stage/process or the first heat exchanger, respectively for boosted MED and boosted MSF processes. Each of the plurality of chambers produces a distillate and a concentrate residue. The system further includes a plurality of inputs coupled to the plurality of distillation chambers introducing heated fluid/vapor into the plurality of distillation chambers such that the temperature of the heated fluid/vapor so introduced decreases from the first input to the last input of the plurality of inputs, the heated fluid/vapor being heated by heat of the second heat source.

In some embodiments, the method and the system of purification can further include a second heating step for heating the liquid, using heat from the concentrate of the at least one condensation step, such that the said heated liquid can be introduced as either the liquid in the first heating step or heated fluid/vapor in one or more of the distillation steps.

In some embodiments, the plurality of distillation steps is a Multi-Effect Distillation (MED) process, or a Multi-Stage Flash Distillation (MSF) process, or a Vapor Compression MED (VC-MED) process such as Thermal Vapor Compression MED process (TVC-MED).

In some embodiments, the method and the system of purification can further include flashing a liquid in a plurality of flashing chambers and introducing the generated vapor from the plurality of flashing chambers to at least one corresponding distillation step.

In some embodiments, the residual concentrate from the plurality of flashing chambers can be recirculated in the plurality of flashing chambers.

In some embodiments, the residual concentrate from the plurality of flashing chambers can be introduced into the one or more of the desalination steps as feed liquid.

In some embodiments, the method and the system of purification can further include using part of the heat from the residual concentrate of the plurality of flashing chambers to preheat feed liquid.

In some embodiments, the heat carrying fluid of the second heat source can be introduced into either one of the plurality of distillation steps or the plurality of flashing chambers.

In a further embodiment the vapor generated from one of the plurality of flashing chambers heated by the second heating step may be upgraded by means of a vapor compressor before being introduced into at least one of the plurality of distillation steps.

In a further embodiment the vapor generated from the plurality of flashing chambers heated by the second heating step may be combined at least partially and then upgraded by means of a vapor compressor before being introduced into at least one of the plurality of distillation steps.

In some embodiments, the primary purpose of the system may be to concentrate the liquid feed, with freshwater production being a secondary outcome.

Further scope of applicability of the present invention will become apparent from the detailed description given hereinafter. However, it should be understood that the detailed description and specific examples, while indicating various embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

BRIEF DESCRIPTION OF TABLES

Table 1. Lists the assumptions made in a simulation comparing MED systems; and

Table 2. Lists the results of a simulation comparing various MED systems.

DETAILED DESCRIPTION

The various embodiments of the invention are described hereinafter with reference to the accompanying drawings, in which embodiments of the invention are shown. However, the various embodiments may be embodied in many different forms and should not be construed as limited to the embodiments set forth herein. Rather, these embodiments are provided to illustrate various aspects of the invention.

Aspects of embodiments of the invention are disclosed in the following description and related drawings directed to specific embodiments of the invention. Alternate embodiments may be devised without departing from the scope of the invention. Alternate embodiments arising out of combination of the below exemplary embodiments are well within the scope of the present invention as will be evident to a person skilled in the art. Additionally, well known elements of the invention will not be described in detail or will be omitted so as not to obscure the relevant details of embodiments of the invention. The terminology used herein is for the purpose of describing particular embodiments only and is not intended to be limiting the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

Throughout the specification reference will be made to a first and second heat source it would be understood to a person skilled in the art that the use of these terms is for clarity in this specification and that in practice the heat could come from a plurality of heat sources.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Figure 1:
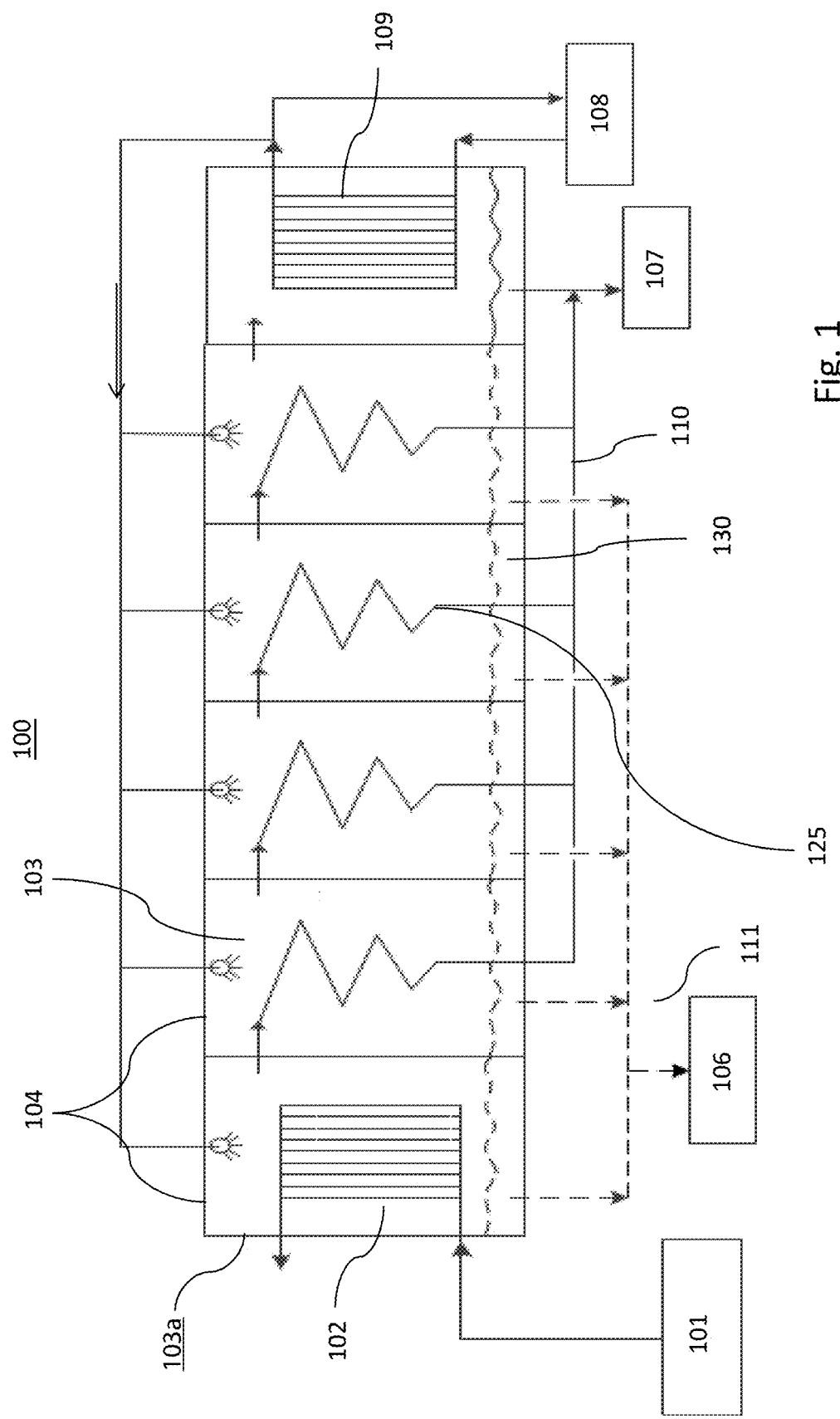
FIG. 1 illustrates conventional MED (Multi-Effect Distillation) system [PRIOR-ART]

Moving on there is shown in FIG. 1 a Multi-Effect Distillation system 100 as existing in PRIOR ART. The system 100 is shown to include a first heat source 101 coupled to a first heat exchanger 102. Feed Liquid 108 is preheated in a second heat exchanger 109 and is introduced into a plurality of desalination chambers 103, called effects, via a plurality of inputs 104.

In FIG. 1 the preheated feed liquid form the second heat exchanger 109 is depicted to be fed in parallel into a plurality of desalination chambers 103, but in practice the same preheated feed liquid can also be fed in series, where forward feeding in series is being more common, or in a combination thereof or even in a counterflow manner.

A person skilled in the art will understand that there is a relationship between saturated temperature and pressure when applied to thermal desalination systems. For clarity in this specification we will refer to temperature only.

Each distillation chamber 103 has a working temperature/pressure at which water vapor from one chamber 103 escapes into an adjacent chamber 103 that is at a lower temperature where it condenses in an condenser/evaporator 125 forming a condensate releasing heat to the corresponding desalination chamber 103.

The general configuration includes a number of chambers, the first distillation chamber 103a is at a higher working temperature then the last distillation chamber 103b The distillation chambers 103 contain at least one evaporator and at least one condenser in close thermal coupling. The condenser/evaporator 125 are complementary parts where on one side vapor is condensed and on the other side the heat released from the condensing vapor is transferred in to the distillation chamber 103 to evaporate further liquid.

The condensate from the plurality of desalination chambers 103 is collected by a condensate line 110 into a fresh water output 107. In each chamber 103, residual concentrate 130 is left as residue and collected by residual concentrate line 111, into a residual concentrate reservoir 106.

The feed liquid 108 is preheated at a second heat exchanger 109. The second heat exchanger 109 derives the heat required for heating the feed liquid 108 from the condensation in the last distillation chamber 103b and the heat transfer from the condensation being exchanged with the feed liquid 108. The preheated feed liquid when introduced into the distillation chambers 103 is further heated by the first heat exchanger 102 in the first distillation chamber 103a or subsequently by the evaporator/condenser 125 of the plurality of desalination chambers 103.

Figure 2:
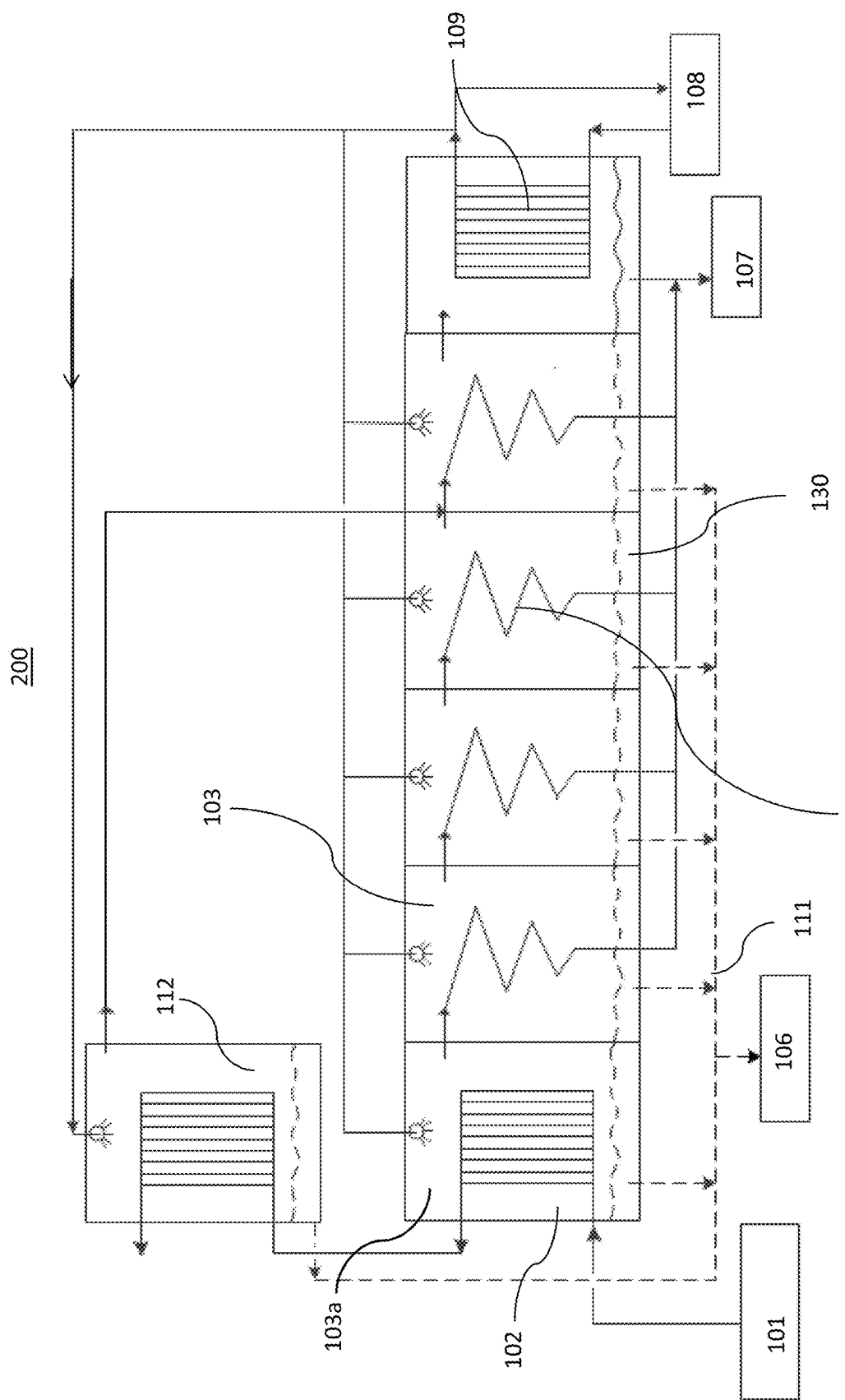
FIG. 2 illustrates a conventional boosted MED [PRIOR-ART]

Moving on there is shown in FIG. 2, a known improvement over the conventional MED system of FIG. 1. The system of FIG. 2 additionally includes a third heat exchanger 112, coupled to the first heat exchanger 102. It uses the heat left unused by the first heat exchanger 102 to heat further preheated feed liquid 108. The vapor produced in chamber 112 is introduced to one of the distillation chambers 103, according to its saturated temperature/pressure.

The present invention seeks to substantially improve upon the 1 prior art as shown in FIG. 1 and FIG. 2.

Figure 3A:
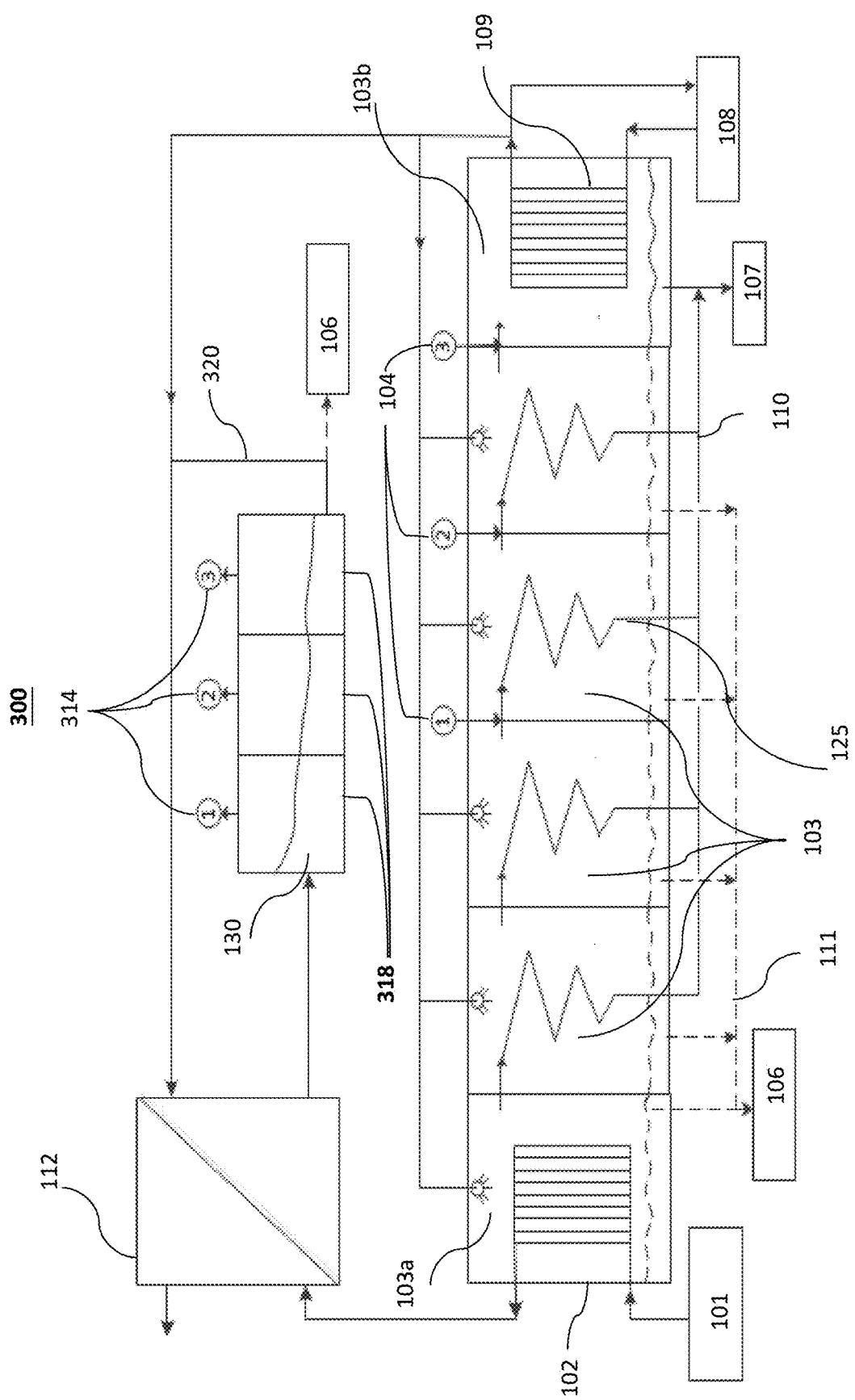
FIGS. 3a and 3b illustrate flash boosted MED in accordance with some exemplary embodiments of the present invention.

There is shown in FIG. 3a an exemplary embodiment of the present invention. The FIG. 3a shows a system 300, as per an embodiment of the present invention. The system 300 includes a first heat source 101, a first heat exchanger 102, a plurality of distillation chambers 103, a condensate line 110, a fresh water store 107 a second heat exchanger 109, a plurality of inputs 104, a third heat exchanger 112, and a plurality of flashing chambers 318.

In an embodiment, the first heat source 101 can be coupled to a first heat exchanger 102. The first heat exchanger 102 can heat liquid containing dissolved elements that is desired to separate from the water contained in the liquid for example salt water or industrial process liquid. The preheated feed liquid may then be introduced into a first distillation chamber 103a (highest temperature) of the plurality of distillation chambers 103 for purification of the liquid.

In an embodiment, the distillation system may be effected as a Multi-Effect Distillation process (MED), Multi-Stage Flash process (MSF) (illustrated in FIG. 7), or a Vapor Compression MED process such as Thermal Vapor Compression MED (TVC-MED) process (illustrated in FIG. 9).

In FIG. 3, a MED process has been illustrated where each chamber of the plurality of distillation chambers 103 includes at least one evaporator/condenser 125 and are in intimate thermal contact.

Each distillation chamber 103 operates a particular working temperature by convention the highest temperature chamber is called the first effect or first distillation chamber 103a. Evaporated liquid from a distillation chamber at a higher temperature is able to pass to a subsequent chamber 103 that is at a lower temperature where it condenses in a condenser/evaporator 125 releasing the heat it carries into the distillation chamber 103. The condensate can be collected in the condensate line 110 and stored into a fresh water store 107.

There is also provided the second heat exchanger 109 that is configured to use the heat from the condenser of the last distillation chamber 103b to preheat feed liquid 108 that is to be introduced into the plurality of distillation chambers 103 via the plurality of inputs 104. The third heat exchanger 312 is also provided and in an embodiment may be coupled to the first heat exchanger 102 to use unused heat from the first heat exchanger 102.

The third heat exchanger 312 is configured to further heat preheated feed liquid received from the second heat exchanger 109 by utilizing the remaining heat in the feed liquid 108 exiting the first heat exchanger 102 to form a hot feed liquid which is subsequently introduced into the plurality of desalination chambers 103 via a plurality of inputs. The introduction being such that the introduced hot feed liquid, which may now be in vapor form, has a temperature substantially approaching the working temperature of the corresponding distillation chamber 103 it is being introduced into.

In another embodiment, the second heat exchanger 109 may not be provided and the heat from the condensate received from the condenser/evaporator 125 of the distillation chambers 103 may be directly introduced into the third heat exchanger 112.

In one configuration the feed liquid may be heated in a second heating step such as the third heat exchanger 112. This heated feed liquid may be introduced into a plurality of flashing chambers 318, from where vapor is produced, said vapor may be introduced or injected into the plurality of distillation chambers 103 according to their working temperature such that the temperature of the vapor introduced into a distillation chamber 103 is above or approaching the working temperature of that distillation chamber 103.

For optimum performance the temperature of the liquid/vapor introduced into the distillation chamber 103 decreases from the first input to the last input so as to keep the temperature of the introduced vapor/liquid about that of the working temperature of the distillation chamber 103.

The system is designed such that the flashing chamber outputs 314 correspond to the plurality of inputs 104 at the distillation chambers 103 and that the temperature of the injected vapor decreases from the injection into a distillation chamber 103 to the injection into subsequent distillation chambers 103.

In yet another exemplary embodiment a residual concentrate recirculation line 320 may be provided to recycle residual concentrate 130 within the flashing chambers 318. In some embodiments, the residual concentrate recirculation line 320 may be further connected to a deaerator (not shown) for removal of oxygen and other dissolved gases from the recirculated residual concentrate.

Figure 3B:
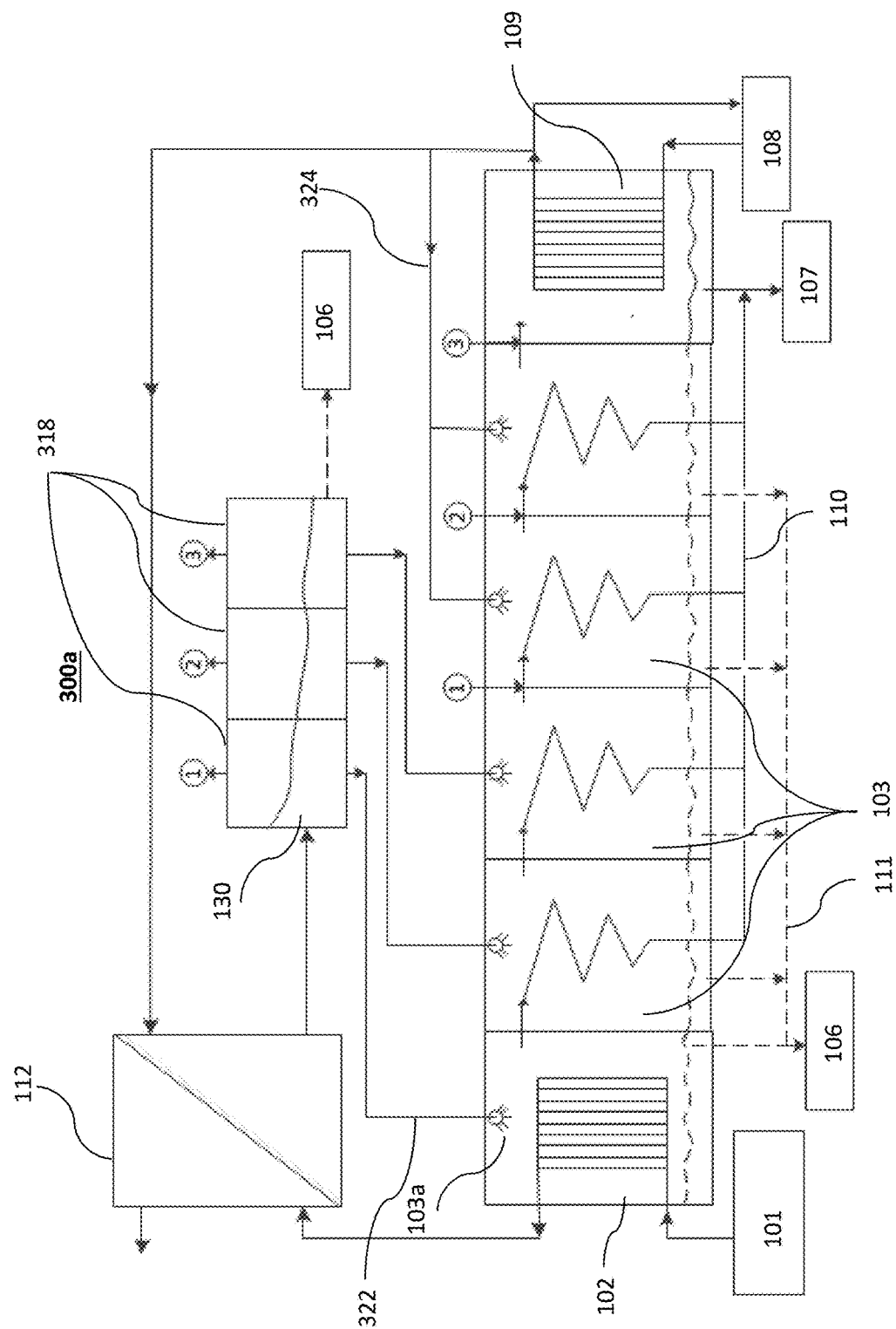

In other embodiments, as illustrated in FIG. 3b, arrangements may be provided in the form of a plurality of fluid couplings 322 that can allow the heated vapor from the plurality of flashing chambers 318 to be introduced into at least one of the plurality of distillation chambers 103. Similarly, there may be arrangements provided for introducing preheated feed from the second heat exchanger 109 via path 324 directly into at least one of the distillation chambers 103, according to some embodiments. Further the residual concentrate 130 may be introduced directly in to one of the distillation chambers 103 or alternatively used to preheat the feed liquid 108.

Figure 4:
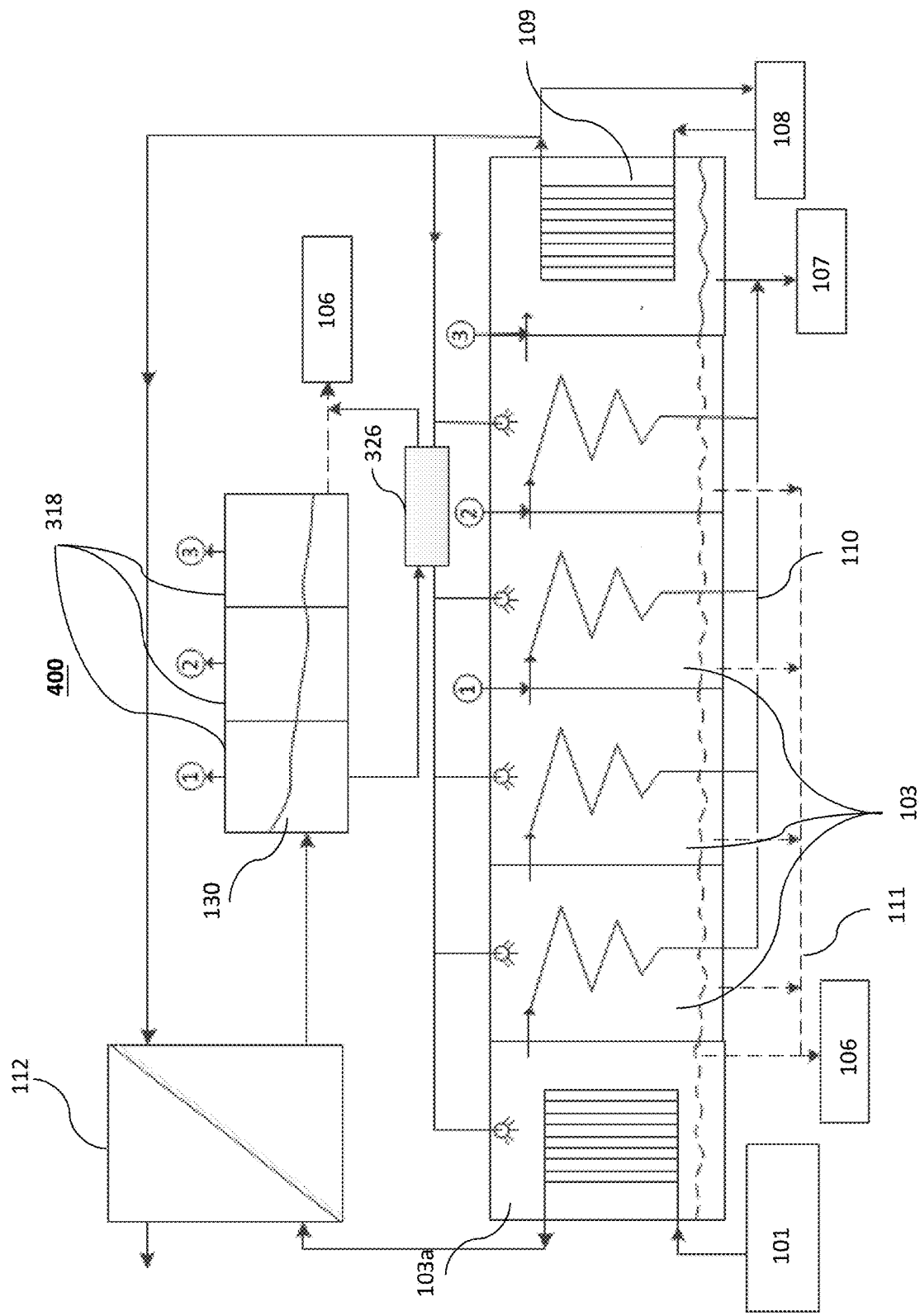
FIG. 4 illustrates an exemplary scenario where residual concentrate residue from a flashing unit is used to preheat saline water, in accordance with an embodiment of the present invention.

In other embodiments a shown in FIG. 4, residual concentrate 130 from the plurality of flashing chambers 318 may be passed through one or more preheaters 326, which in some embodiments may be in the form of a heat exchanger. This preheater 326 may be configured to preheat feed liquid either from the second heat exchanger 109 or feed liquid 108. In some embodiments the liquid so preheated may be introduced into at least one of the distillation chambers 103 while in some embodiments the liquid so preheated may be introduced into at least one of the flashing chambers 318.

Figure 5A:
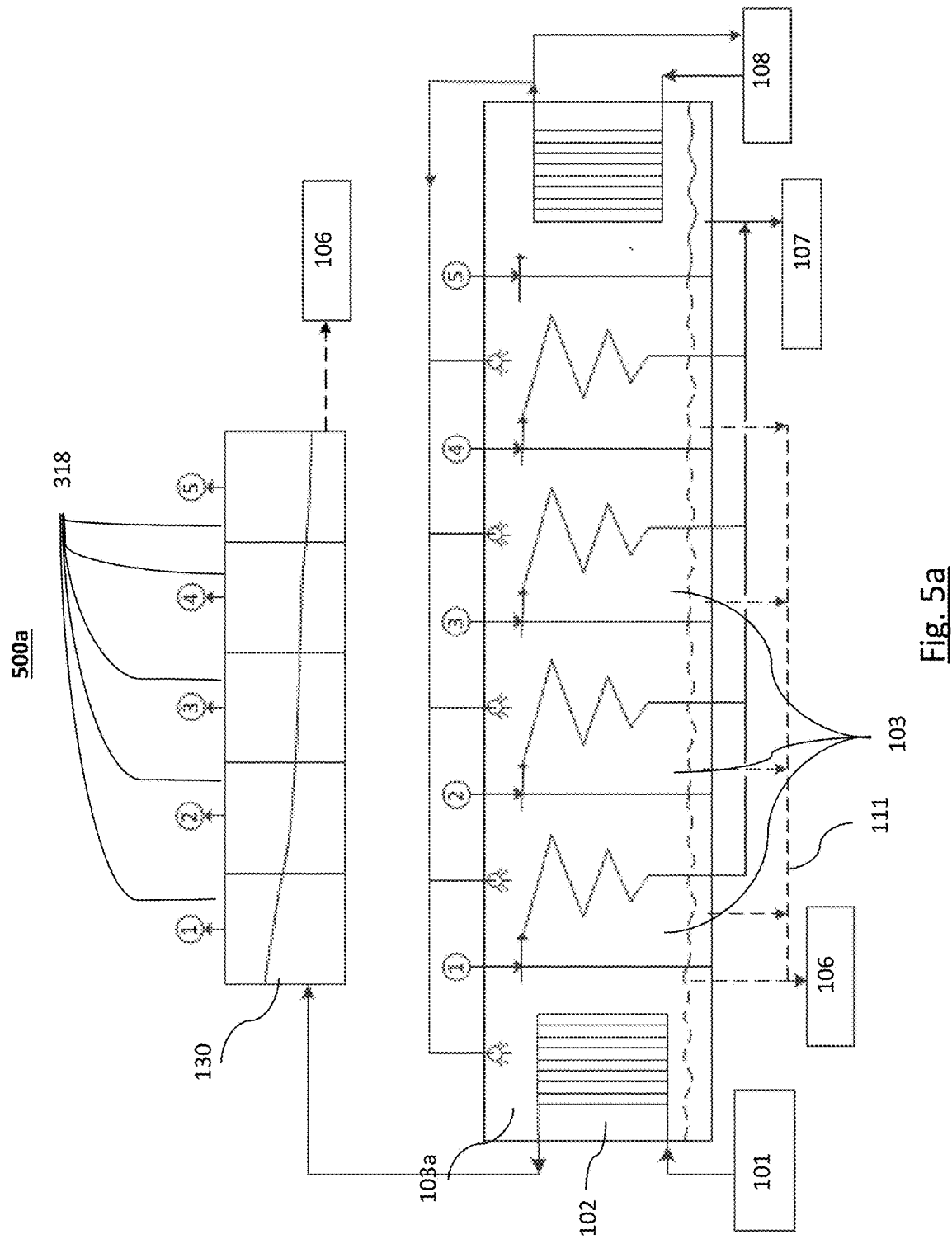
FIGS. 5a and 5b illustrate exemplary scenarios effecting an embodiment of the present invention where fluid from the heat source is directly used for flashing, in accordance with an embodiment of the present invention.
Figure 5B:
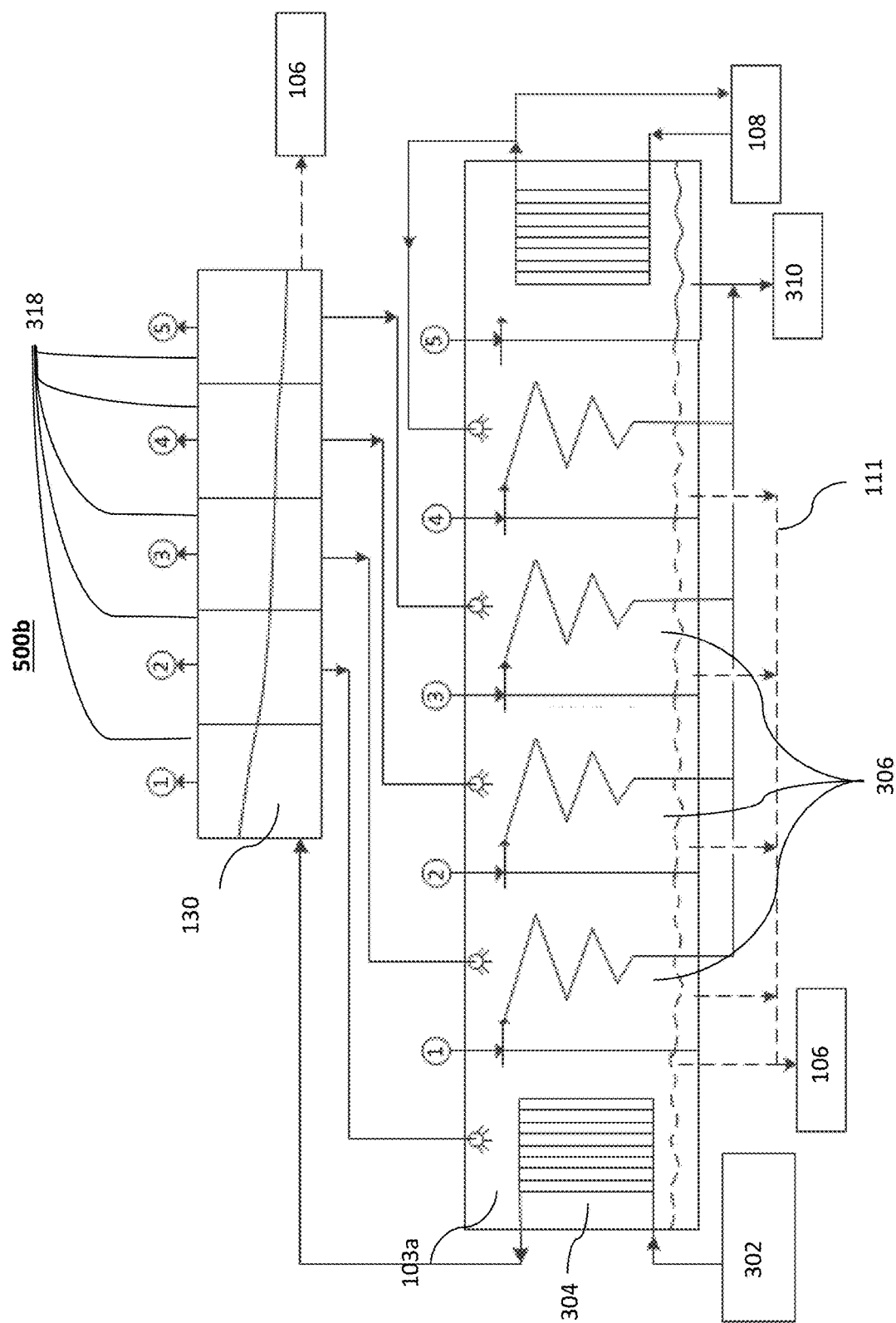

In other exemplary embodiments as shown in FIG. 5a and FIG. 5b, heat containing fluid from the first heat exchanger 102 may be introduced directly into the flashing chambers 318 wherefrom it may be introduced into distillation chambers 103 as described above in previous embodiments. In some embodiments a preheater 326 may be included to use the heat from the residual concentrate 130 from the flashing chambers 318 to preheat feed liquid 108.

Figure 6:
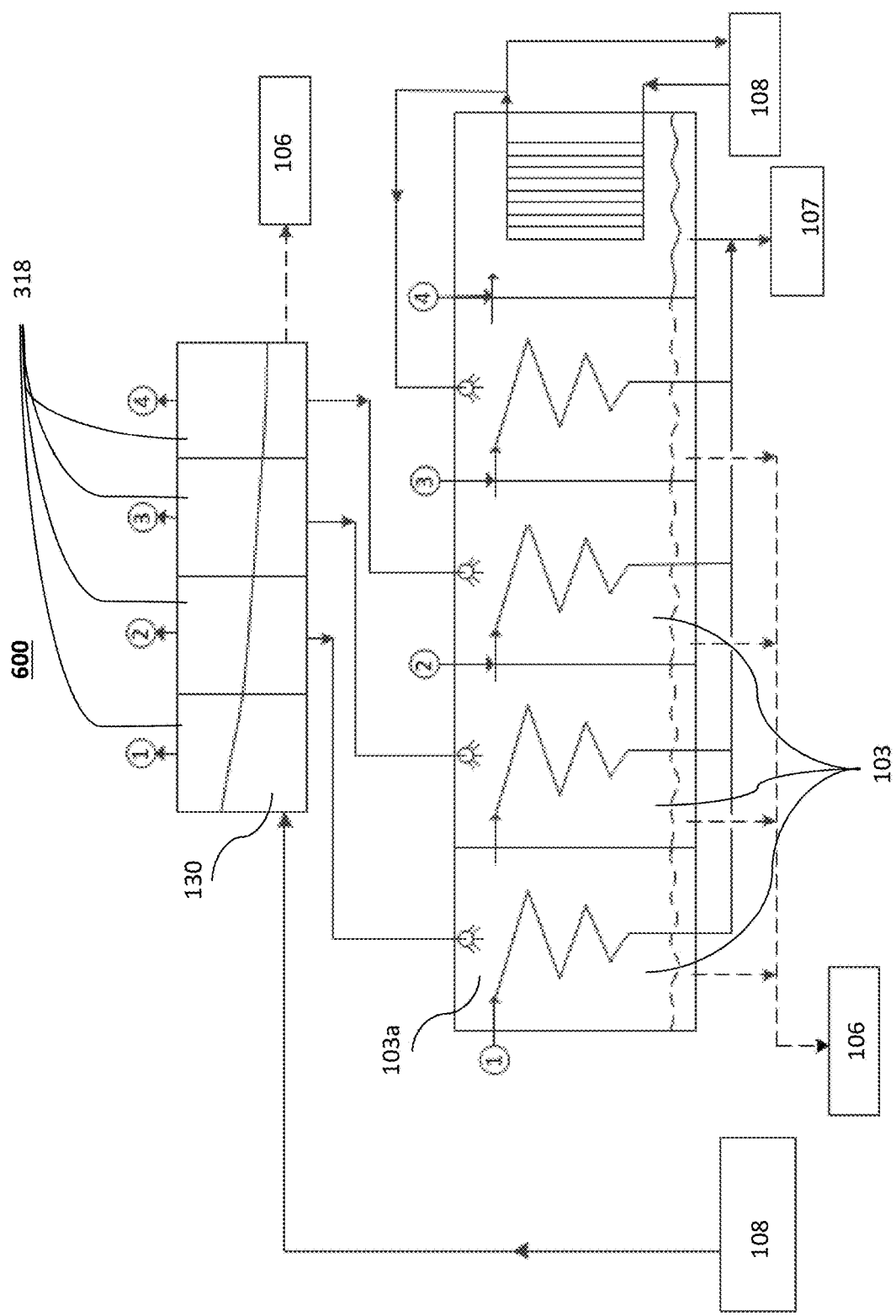
FIG. 6 illustrates exemplary scenarios effecting an embodiment of the present invention where no heat exchanger is used for heating and only flashing is utilized for heating fluid being introduced into the desalination chambers, in accordance with an embodiment of the present invention.

In another embodiment as shown in FIG. 6, the first heat exchanger 102 may not be provided and the feed liquid 108 may be introduced directly into the flashing chambers 318 wherefrom it may be introduced into distillation chambers 103 as described above in previous embodiments.

Figure 7:
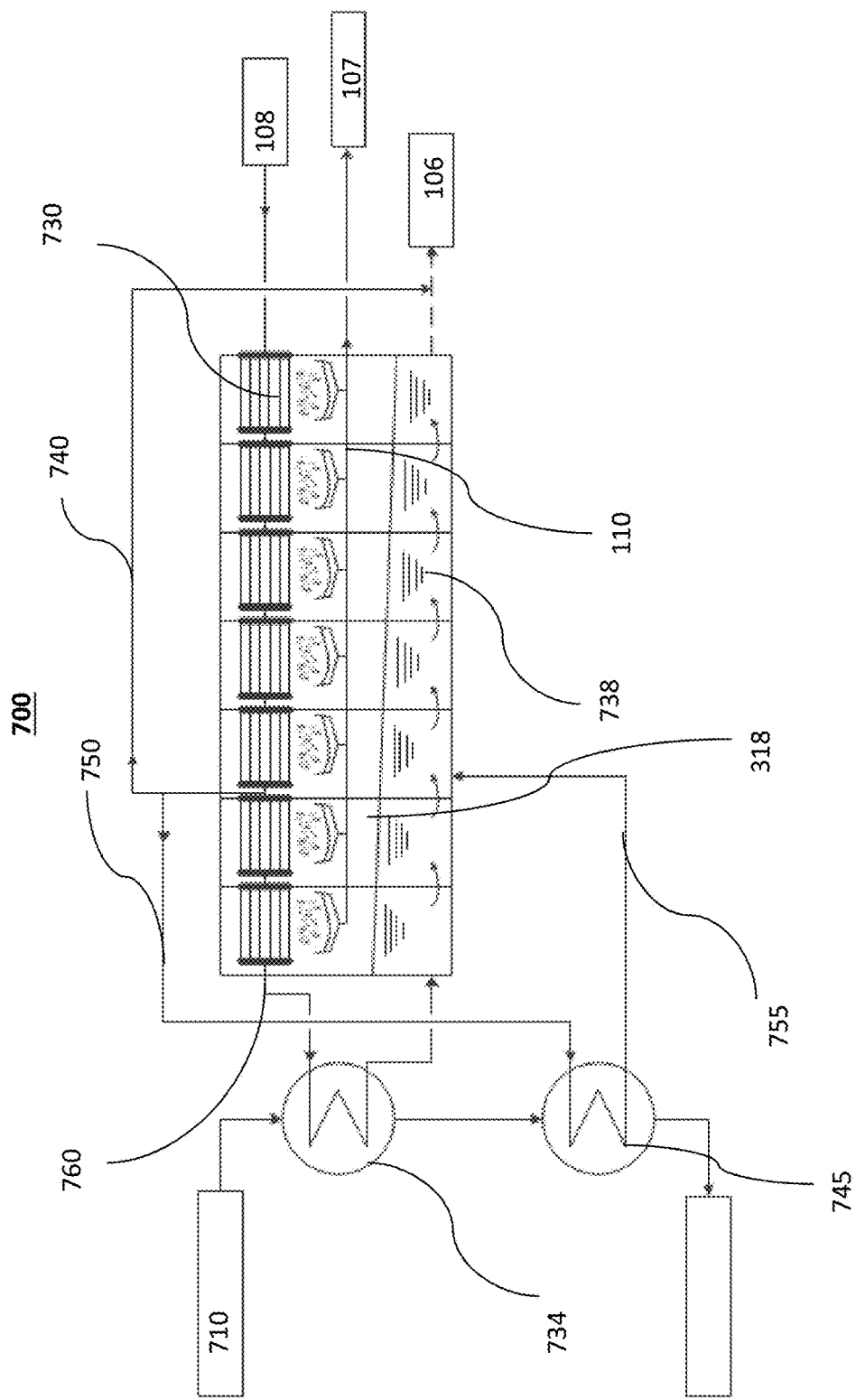
FIG. 7 illustrates a boosted MSF in accordance with some exemplary embodiments of the present invention.

Referring to FIG. 7 there is shown a boosted MSF system 700 as per the embodiments of the present invention. This MSF system 700 can be used in low-grade heat source applications.

There is shown in 700 a feed liquid 108 to come through a series of condensers 730 and is heated up in a residual concentrate heater 734 and then goes into the plurality of flashing chambers 318 for evaporation.

The residual concentrate heater is fed with a liquid heat source 710. This liquid heat source is used in the first residual concentrate heater 734 where a significant portion of the heat from the liquid heat source is removed. The liquid heat source 710 is then used in a second residual concentrate heater 745 after passing through the first residual concentrate heater 734 where more of the heat is extracted from the liquid heat source. It will be clear to a person skilled in the art that not all the heat can be extracted from the liquid heat source 710. However the advantage of the inventive system disclosed by this patent is that more of the heat is extracted from the liquid heat source using the arrangements described than would otherwise occur with the prior art systems.

In a preferred embodiment the feed liquid 108 is tapped into after is has passed through a number of the condensers 730 through a condenser line 760. This stream is split three ways—the majority of the stream continues to go through the condensers 730 to the residual concentrate heater 734. A small stream is discharged to waste via blowdown line 740 (this is done for mass balance of the plant). A third stream of medium proportion of the feed liquid 108 now called a boost stream 750 is directed to the second residual concentrate heater 745. The boost stream 750 is injected into the MSF unit via an injection line 755.

The point of injection of the liquid from the second residual concentrate heater 745 is determined by the relationship of temperature and pressure in the flashing chambers 318 and the temperature of the boost fluid 755 coming from the second residual concentrate heater 745.

Thereafter, the principle of this embodiment is similar as previous embodiments involving the MED stage, in that the condensers 730 produce condensate that is collected via a condensate line 110 to a freshwater store 107. The stream from the first residual concentrate heater 734 can go into the second residual concentrate heater 745 and release its energy to the boost stream 750.

In the example shown the boost stream 750 comes out from the condenser line 760 at the third stage of the MSF and is introduced back into the MSF at the same stage after the boost stream has picked up further heat from the second residual concentrate heater 745. The same as above can be implemented with more residual concentrate heaters if the outlet temperature of the secondary residual concentrate heater is hot enough.

In other embodiments, a plurality of heaters can be used for separate feeds and not necessarily for residual concentrate coming out of the condenser lines.

Figure 9A:
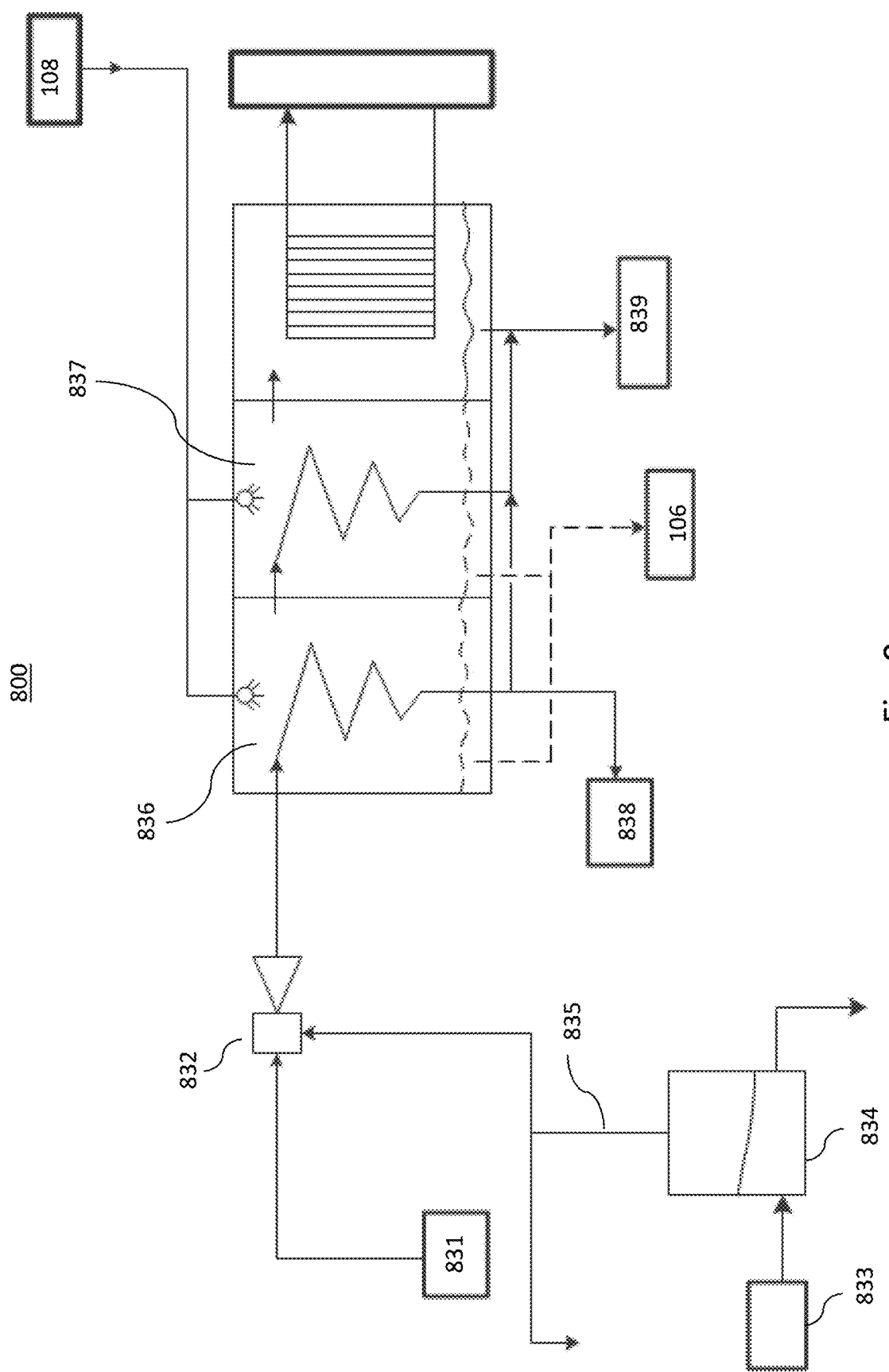
FIG. 9a illustrates a prior art Thermal Vapor Compression Multi Effect Distillation (TVC-MED) system

FIG. 9a shows a Thermal Vapor Compression Multi Effect Distillation system 800. The live steam 831 is mixed in a thermo-compressor 832 with a portion of wasted flashed vapor 835 generated in a flash vessel 834 using a liquid waste heat source 833, to increase the pressure/temperature of the waste flashed vapor 835 to run an MED process. Part of the condensate generated in the first distillation chamber 836 is returned to the steam plant as live steam condensate (838), the remainder is fed to the freshwater output 839.

Figure 9B:
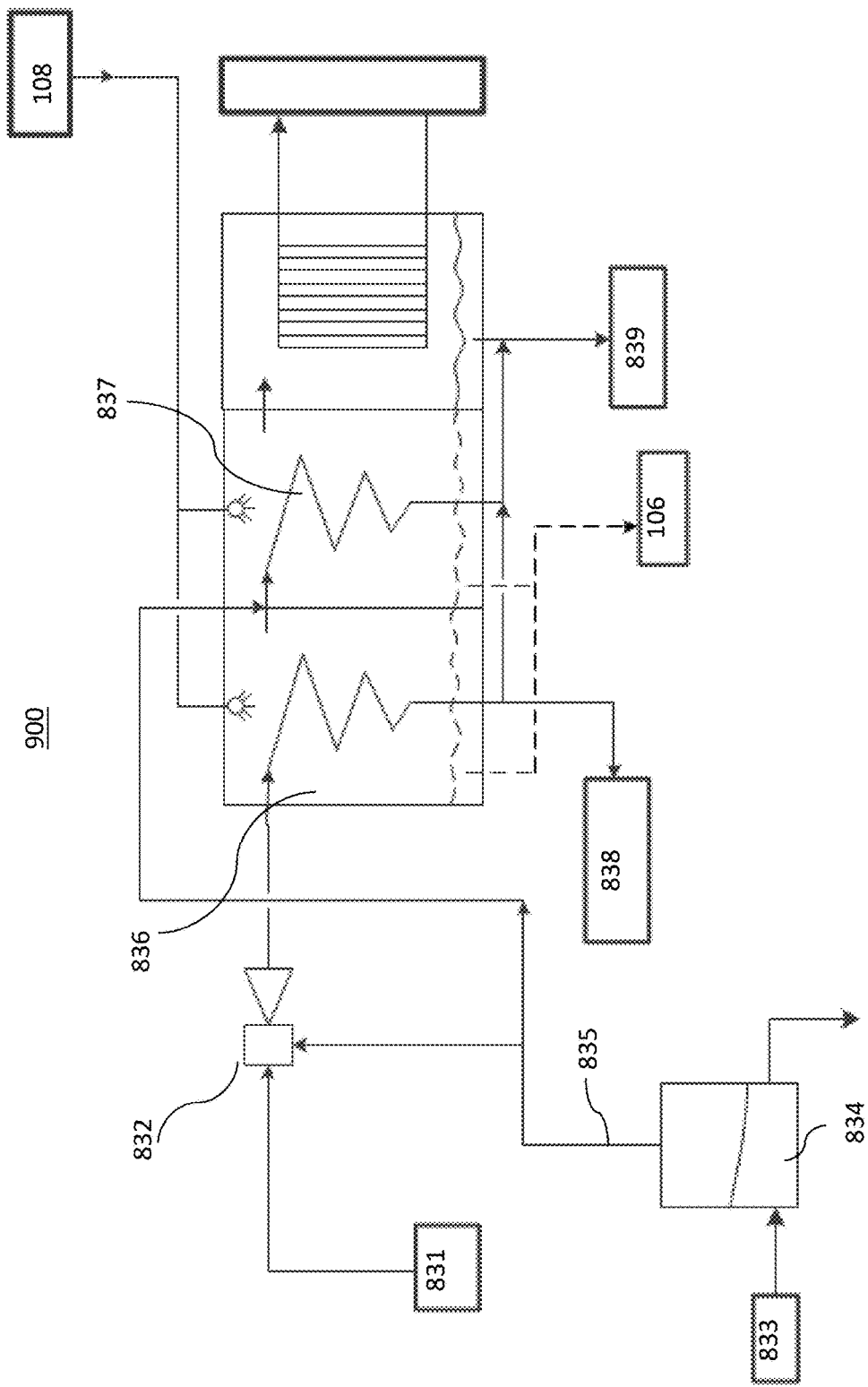
FIG. 9b illustrates a Flash Boosted Thermal Vapor Compression Multi Effect Distillation (FB-TVC-MED) system incorporating flash boosting of the primary MED module with steam from a flash vessel driven by a waste heat source.

FIG. 9b shows a Flash Boosted TVC-MED system (FB-TVC-MED) 900. In this system waste flashed vapor 835 generated from the first heat source 833 in a flash vessel 834 is fed in part to the thermo-compressor 832 to mix with live steam 831. A portion of the waste flash vapor 835 is introduced (or "boosted") into the $2^{nd}$ distillation chamber 837.

In the example system shown, full use is made of the available waste flashed vapor (835) generated from the first heat source 833 in a flash vessel 834.

Compared to the TVC-MED system, a reduced quantity of live steam 831 is introduced into the first distillation chamber 836, while the $2^{nd}$ distillation chamber 837 receives an increased quantity of steam.

The size of the distillation chambers must be designed to suit the revised operating conditions. Due to the high recovery of the available heat source the volume of live steam consumed 831 is reduced while at the same time increasing freshwater production.

Simulation Results:

To better illustrate and elucidate the advantages of this invention, the results of a simulation implementing the invention are presented below.

However, the experiment provided should not be construed as limiting the scope of the invention in any way and is presented in an exemplary way only showing the advantages provided by the present invention.

In this experiment, a conventional MED system as illustrated in FIG. 1, a boosted MED system as illustrated in FIG. 2 and an MED system according to some exemplary embodiments of the present invention as illustrated in FIG. 3a were compared under assumptions as per Table 1 below:

TABLE 1

Assumptions made in a simulation comparing MED systems

| | |
|---|---|
| Top residual concentrate temperature (° C.) | 70 |
| Heat source flow rate, $\dot{m}_{hs}$ (kg/s) | 100 |
| $C_{P,hs}$ (kJ/kg · K) | 4.187 |

TABLE 1-continued

| Assumptions made in a simulation comparing MED systems | |
|---|---|
| $T_{cond,in}$ (° C.) | 28 |
| $T_{cond,out}$ (° C.) | 38 |
| $\Delta T_{inj}^{\#}$ (° C.) | 3 |
| Liquid-to-Liquid heat exchanger approach temperature (° C.) | 3 |
| $X_f$ (ppm), MED effects inlet | 35,000 |
| $X_b$ (ppm), MED effects outlet | 78,750 |

Water was taken as the heat source medium and its flow rate was fixed at 100 kg/s in all simulations. The inlet seawater temperature at the condenser was set as 28° C. and the salinity of the seawater was set as 35000 ppm. The top residual concentrate temperature was capped at 70° C. For the liquid-to-liquid heat exchanger the minimum temperature of approach was taken to be 3° C. For vapor injection to happen from the flashing chamber to the judicious effect in the primary MED plant, a pressure difference equivalent to 3° C. saturated temperature difference was considered to be sufficient. The results of the simulations at different heat source inlet temperatures are depicted in Table 2.

TABLE 2

Results of a simulation comparing various MED systems

| | Heat source inlet temp. (° C.) | | | | | |
|---|---|---|---|---|---|---|
| | 65 | 70 | 75 | 80 | 85 | 90 |
| Conventional MED[#] Freshwater yield (m³/day) | 511 | 723 | 714 | 942 | 1489 | 2046 |
| Number of effects (Max.) | 5 | 6 | 8 | 9 | 9 | 9 |
| Optimized Conventional MED Freshwater yield (m³/day) | 619 | 906 | 1224 | 1580 | 1981 | 2397 |
| Number of effects | 3 | 4 | 5 | 5 | 6 | 6 |
| Boosted MED Freshwater yield (m³/day) | 820 | 1171 | 1553 | 1998 | 2470 | 2952 |
| Number of effects/Injected effect's number | 5/5 | 6/6 | 6/6 | 7/6 | 8/7 | 8/7 |
| Flash Boosted MED [Present invention] Freshwater yield (m³/day) | 888 | 1314 | 1874 | 2411 | 2905 | 3403 |
| Number of MED effects/Flashing stages | 5/3 | 6/4 | 8/6 | 9/7 | 9/7 | 9/7 |

Figure 8:
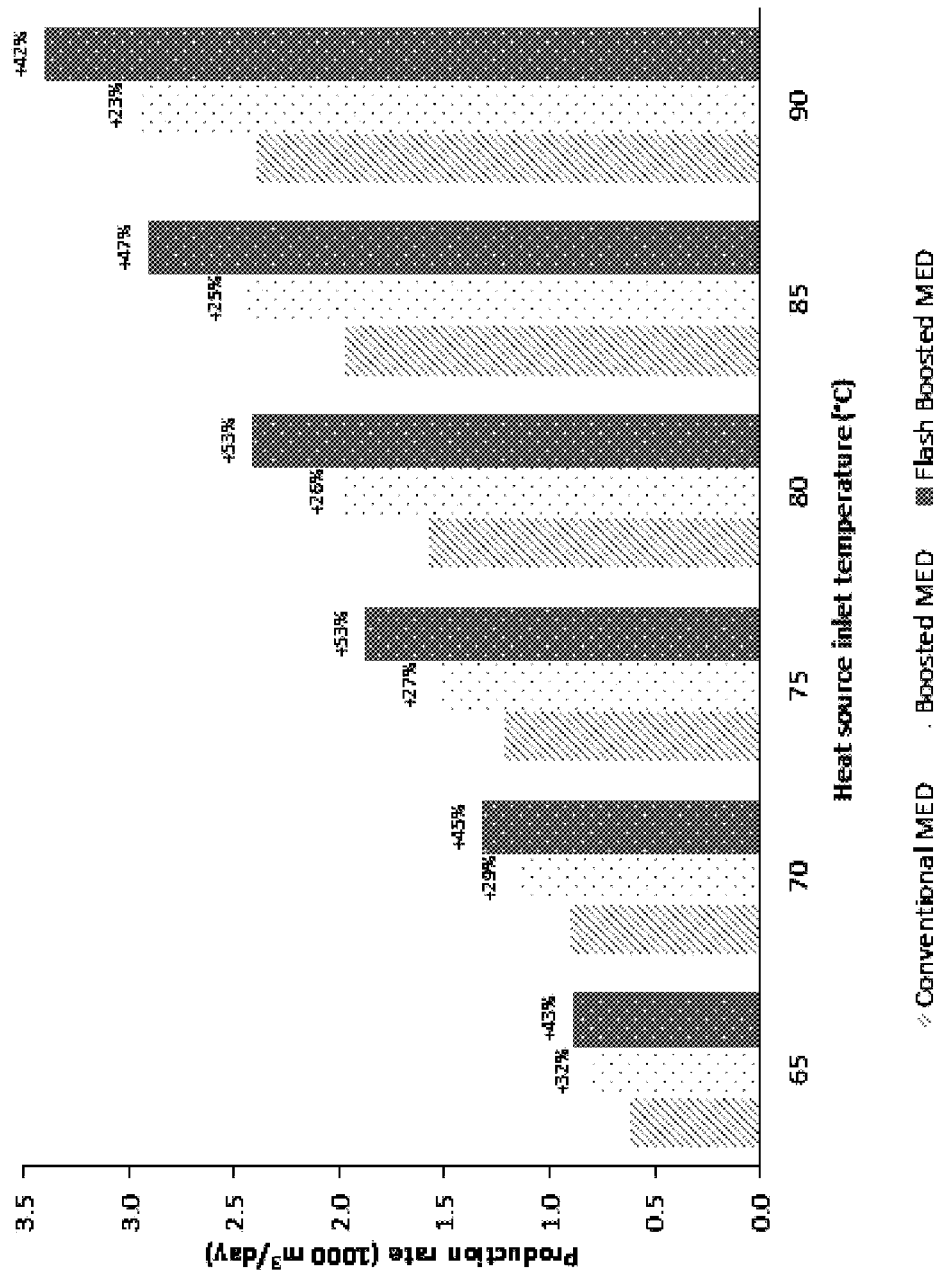
FIG. 8 is a graphical representation comparison of performance data of a conventional MED, a boosted MED and implementation of an exemplary embodiment of the present invention.

A comparative graphical representation of the simulation results is presented in FIG. 8. The graph compares the production rate of water with respect to the heat source inlet temperature for a conventional MED, a boosted MED and a flash boosted MED as per an exemplary embodiment of the present invention. It is evident from the graph in FIG. 8 based on results from Table 2 that production rate of fresh water is substantially improved in the system implementing an exemplary embodiment of the current invention, over a conventional MED system or a boosted MED system.

In summary improvements in production rate over conventional MED systems as high as 53% are realized in a simulatory implementation of an exemplary embodiment.

Simulation results comparing the FB-TVC-MED (900) vs. TVC-MED (800) system for a particular application generated the following outputs: Reduction of live steam consumption from 0.4 kg/s to 0.2 kg/s, increase in freshwater production from 3.1 kg/s to 3.7 kg/s, while making full use of the flashed vapor generated from the waste heat source (1.5 kg/s instead of 0.5 kg/s)

It should be further appreciated by those skilled in the art that the figures provided are for illustrative purposes only and the number of chambers shown are exemplary scenarios and the system according to the invention can include more or lesser number of chambers, within the scope of the present invention.

Further, in the embodiment described above there may be advantages in utilizing all of the heat generated by the system, there may also be advantage in using externally applied heat sources to the system at different points. It will be appreciated that the specific arrangements of which will be determined by the skilled person and designed according to specific applications, all of which fall within the present invention.

It will be further appreciated that the present invention is applicable to a range of different thermal separation systems and represents an increased efficiency which will provide a beneficial result when applied to said systems.

The invention claimed is:

1. A method of removing dissolved elements from a liquid, the method comprising:
   a) heating the liquid in a first heating step using a first heat source;
   b) introducing said heated liquid from the first heating step into a plurality of distillation steps for purifying the liquid heated by the first heating step, each of the plurality of distillation steps comprising at least one evaporation step and at least one condensation step, each of the plurality of distillation steps producing a distillate and a residual concentrate; and
   c) a second heating step for heating an additional volume of liquid;
   d) introducing heated liquid from the second heating step into a plurality of flashing chambers, each generating a volume of vapor;
   wherein at least a portion of the vapor from at least one of the plurality of flashing chambers is introduced into at least one of the plurality of distillation steps through one of a plurality of inputs consisting of a first input and a series of subsequent inputs, the vapor being introduced having a higher temperature than the temperature in the distillation step that is being introduced into.

2. The method of claim 1, wherein temperature of the generated vapor introduced into the distillation chambers decreases from the first input to the last input of the plurality of inputs.

3. The method according to claim 1, wherein the first heating step uses a first heat exchanger for heating the liquid.

4. The method according to claim 1, wherein the unused heat from the first heating step is utilized in the second heating step.

5. The method according to claim 1, wherein the residual concentrate from the plurality of flashing chambers is recirculated in the plurality of flashing chambers.

6. The method according to claim 1, wherein the residual concentrate from the plurality of flashing chambers is introduced into at least one of the plurality of distillation steps as feed liquid.

7. The method according to claim 1, further comprising using part of the heat from the residual concentrate of the plurality of flashing chambers to preheat feed liquid.

8. The method according to claim 1, wherein the second heat source is introduced into at least one of the plurality of distillation steps.

9. The method according to claim 1, wherein the plurality of distillation steps is a MultiEffect Distillation (MED) process.

10. The method according to claim 1, wherein the at least one distillation step is a Multi-Stage Flash Distillation (MSF) process.

11. The method according to claim 1, wherein at least one heating step includes vapor Compression.

* * * * *